(12) United States Patent
Damstra et al.

(10) Patent No.: US 10,911,694 B2
(45) Date of Patent: Feb. 2, 2021

(54) SYSTEM AND METHOD FOR CREATING METADATA MODEL TO IMPROVE MULTI-CAMERA PRODUCTION

(71) Applicant: GVBB HOLDINGS S.A.R.L., Luxembourg (LU)

(72) Inventors: Nicolaas Johannes Damstra, Breda (NL); Stelian Florin Persa, Breda (NL); John Hommel, Nieuw Vossemeer (NL)

(73) Assignee: GVBB HOLDINGS S.A.R.L., Luxembourg (LU)

(*) Notice: Subject to any disclaimer, the term of this patent is extended or adjusted under 35 U.S.C. 154(b) by 0 days.

(21) Appl. No.: 15/919,536

(22) Filed: Mar. 13, 2018

(65) Prior Publication Data
US 2018/0270427 A1 Sep. 20, 2018

Related U.S. Application Data

(60) Provisional application No. 62/471,483, filed on Mar. 15, 2017.

(51) Int. Cl.
*H04N 5/268* (2006.01)
*H04N 21/218* (2011.01)
(Continued)

(52) U.S. Cl.
CPC .............. *H04N 5/268* (2013.01); *G06T 7/571* (2017.01); *H04N 5/222* (2013.01); *H04N 5/232* (2013.01);
(Continued)

(58) Field of Classification Search
CPC ........ H04N 5/268; H04N 5/247; H04N 5/222; H04N 5/23212; H04N 5/2354;
(Continued)

(56) References Cited

U.S. PATENT DOCUMENTS

| 2008/0219654 A1* | 9/2008 | Border | H04N 5/23212 396/89 |
| 2010/0091113 A1* | 4/2010 | Morioka | H04N 5/147 348/207.1 |

(Continued)

FOREIGN PATENT DOCUMENTS

EP 2150057 A2 2/2010

OTHER PUBLICATIONS

International Search Report and Written Opinion dated Apr. 24, 2018, regarding PCT/EP2018/056461.

*Primary Examiner* — Joseph Suh
(74) *Attorney, Agent, or Firm* — Arent Fox LLP

(57) ABSTRACT

A system and method is provided for using camera metadata from multiple cameras in a live environment to improve video production workflow. Each camera of the system is provided to media content of a live scene and store camera metadata that includes camera lens, position and gyro setting. This metadata can then be provided to other cameras in the system and/or a control that can generate a 3D metadata feed using the camera metadata. Moreover, based on the metadata feed, control instructions can be generated and transmitted to one or more of the cameras to control camera operations for capturing the media content.

21 Claims, 5 Drawing Sheets

(51) Int. Cl.

| | |
|---|---|
| *H04N 21/80* | (2011.01) |
| *H04N 21/2187* | (2011.01) |
| *H04N 5/232* | (2006.01) |
| *H04N 21/234* | (2011.01) |
| *H04N 5/222* | (2006.01) |
| *H04N 5/247* | (2006.01) |
| *G06T 7/571* | (2017.01) |
| *H04N 5/235* | (2006.01) |
| *H04N 5/262* | (2006.01) |

(52) U.S. Cl.
CPC ....... *H04N 5/2354* (2013.01); *H04N 5/23212* (2013.01); *H04N 5/23296* (2013.01); *H04N 5/247* (2013.01); *H04N 5/2628* (2013.01); *H04N 21/2187* (2013.01); *H04N 21/21805* (2013.01); *H04N 21/23418* (2013.01); *H04N 21/80* (2013.01); *G06T 2200/04* (2013.01); *G06T 2207/10016* (2013.01); *G06T 2207/10148* (2013.01); *G06T 2207/30221* (2013.01)

(58) Field of Classification Search
CPC ............. H04N 21/80; H04N 21/23418; H04N 21/2187; H04N 5/23296; H04N 5/232; H04N 5/2628; H04N 21/21805; G06T 7/571; G06T 2200/04; G06T 2207/10016; G06T 2207/10148; G06T 2207/30221
See application file for complete search history.

(56) References Cited

U.S. PATENT DOCUMENTS

| | | | |
|---|---|---|---|
| 2011/0069179 A1 | 3/2011 | Bathiche et al. | |
| 2012/0308162 A1* | 12/2012 | Le Gue | G11B 27/031 382/309 |
| 2013/0136367 A1* | 5/2013 | Kitajima | G06K 9/4604 382/199 |
| 2015/0085145 A1* | 3/2015 | Sinha | H04N 5/23222 348/207.1 |
| 2015/0142857 A1* | 5/2015 | Collins | H04N 5/2256 707/804 |
| 2015/0312553 A1 | 10/2015 | Ng et al. | |
| 2016/0191856 A1* | 6/2016 | Huang | G06K 9/6267 348/159 |
| 2016/0266347 A1* | 9/2016 | Shimoda | G02B 7/32 |
| 2016/0381171 A1* | 12/2016 | Anderson | H04L 65/4069 709/217 |
| 2017/0209795 A1* | 7/2017 | Harvey | A63F 13/65 |
| 2018/0012079 A1* | 1/2018 | Blanchflower | G06Q 30/02 |
| 2018/0109722 A1* | 4/2018 | Laroia | H04N 5/23216 |
| 2018/0139368 A1* | 5/2018 | Nakayama | H04N 5/235 |
| 2018/0255336 A1* | 9/2018 | Tallamy | H04N 21/25891 |

\* cited by examiner

SYSTEM AND METHOD FOR CREATING METADATA MODEL TO IMPROVE MULTI-CAMERA PRODUCTION

CROSS REFERENCE TO RELATED APPLICATIONS

The present application claims priority to U.S. Provisional Patent Application No. 62/471,483, filed Mar. 15, 2017, the entire contents of which are hereby incorporated by reference in their entirety.

TECHNICAL FIELD

The present disclosure generally relates to video production, and, more particularly, to a system and method of using camera metadata from multiple cameras in a live environment to improve video production workflows.

BACKGROUND

The production of a live or live-to-tape video show (such as a broadcast, sports broadcast, talk show, concert registration, network news, or the like) is largely a manual process that involves a team of specialized individuals that work together in a video production environment having a studio and a control room. The video production environment is comprised of many types of video production devices, such as video cameras, microphones, video disk recorders, video switching devices, audio mixers, digital video effects devices, teleprompters, video graphic overlay devices, and the like.

In the conventional production environment, most of the video production devices are manually operated by a production crew of artistic and technical personnel working together under the direction of a director. For example, a standard production crew can include camera operators, a video engineer who controls the camera control units for a set of cameras, a teleprompter operator, a character generator operator, a lighting director who controls the studio lights, a technical director who controls the video switcher, an audio technician who controls an audio mixer, operator(s) who control(s) a bank of recorders and play-back units, and the like.

One of the first steps of video production for a show entails the capturing of video content by one or more camera operators. Specifically, each camera operator's task is to make the right or best "framing" of the shot (i.e., what is visible in the camera screen and what falls outside of the visible area of the camera) and to ensure that the right part of the framing is spot-on in focus. However, while each camera operator (and also mechanically operated cameras) will receive instructions from the video engineer or director, for example, the video production environment typically involves a number of cameras that are capturing common/overlapping content independently and not in a truly coordinated fashion.

As a result, there are still many cumbersome steps between the initial capturing of media content and the final production. This is especially true when the number of cameras at a specific venue, such as a sports venue, exceeds ten or even dozens of cameras, while the shading engineers and the director are located in the studio. In these types of situations, it is often a complicated process to manage the content captured by each camera and determine which of the one or few viewpoints is ideal from the technical director's artistic viewpoint. This becomes even more complicated if additional alternative feeds (content) have to be created for additional second screens like smartphones, tablets or personal computers, for example. Thus, a solution is needed that facilitates a coordinated effort of multiple cameras automatically working together for a live environment to improve video production workflow.

SUMMARY

Accordingly, a system and method is disclosed herein for using camera metadata from multiple cameras in a live environment to improve video production workflow. For example, a system is provided for using camera metadata from multiple cameras in a live environment. In one embodiment, the system includes a first camera configured to capture first media content of a live scene and configured to store first camera metadata including camera lens, position and gyro setting of the first camera, and a second camera configured to capture second media content of the live scene and configured to store second camera metadata including camera lens, position and gyro setting of the second camera. Moreover, the system can include a controller configured to generate a metadata feed using at least the first and second camera metadata, generate a control instruction based on the metadata feed, and transmit the control instruction to at least one of the first and second cameras to control camera operation thereof for capturing the respective media content.

In another aspect of the exemplary system, the controller is part of a video production environment including a video switcher operable to generate a video production of the live scene at least partially based on the metadata feed.

In another aspect of the exemplary system, the metadata is a 3D metadata feed according to the relative camera lens, position and gyro setting of the first and second cameras.

In another aspect, the exemplary system can further include a database configured to store the first camera metadata and the second metadata and link the respective metadata to the captured first and second media content.

In another aspect of the exemplary system, the first and second camera metadata includes respective positions relative to the live scene of the first and second cameras.

In another aspect of the exemplary system, the controller is further configured to calculate a distance between at least one of the first and second cameras and an object in the live scene using triangulation.

In another aspect of the exemplary system, the controller is further configured to generate a high resolution depth map for the at least one camera based on the distance to the object and generate the control instruction to perform an autofocus of the object in the live scene using the high resolution depth map.

In another aspect of the exemplary system, the control instructions generated by the controller controls at least one of the camera lens, position and gyro setting of the at least one of the first and second cameras to modify the capturing of the respective live media content.

In yet another exemplary aspect, the system includes at least one lighting device configured to generate lighting metadata relating to at least one operational setting of the at least one lighting device, and wherein the at least one metadata feed generator is further configured to generate the at least one metadata feed using the lighting metadata, such that the at least one control instruction is configured to adjust an operation of the at least one camera based on the at least one operational setting of the at least one lighting device.

In yet another exemplary aspect, a system is disclosed that uses camera metadata from multiple cameras in a live environment for video content capture and production. In this aspect, the system includes a first camera configured to capture first media content of a live scene and configured to store first camera metadata including camera lens, position and gyro settings of the first camera and a second camera configured to capture second media content of the live scene and configured to store second camera metadata including camera lens, position and gyro settings of the second camera. Moreover, the system includes at least one metadata feed generator configured to generate a least one metadata feed using at least the first and second camera metadata; and a content capture controller configured to generate at least one control instruction based on the generated at least one metadata feed.

According to the exemplary aspect, the at least one control instruction is transmitted to at least one of the first and second cameras to control a camera operation thereof for capturing at least one of the first and second media content, respectively. Moreover, the first and second camera metadata includes respective positions of the first and second cameras relative to the live scene. In addition, the at least one metadata feed generator can further be configured to calculate a distance between at least one of the first and second cameras and an object in the live scene using triangulation based on the first and second cameras, and the content capture controller can further be configured to generate a high resolution depth map for the at least one camera based on the distance from the at least one camera to the object in the live scene and to generate the at least one control instruction to autofocus the at least one camera for the object in the live scene using the generated high resolution depth map.

According to yet another exemplary aspect, a system is provided for dynamically controlling video content capture using camera metadata from in a live environment. In this aspect, the system includes a plurality of cameras each configured to capture media content and to generate respective camera metadata relating to at least one content capture setting of the respective camera for capturing the respective media content; a metadata feed generator configured to generate a metadata feed by combining the generated camera metadata from the plurality of cameras; and a media capture controller configured to generate at least one content capture control instruction based on the generated metadata feed to modify the at least one content capture setting of at least one of the plurality of cameras to control the respective capturing of the media content.

In a refinement of the exemplary aspect, the respective content capture settings of the plurality of comprise camera lens, position and gyro settings of the respective camera and the generated at least one content capture control instruction modifies at least one setting of the camera lens, position and gyro settings of the respective camera.

In a refinement of the exemplary aspect, the respective metadata of each of the plurality of cameras includes respective positions of the first and second cameras relative to the live scene.

In a refinement of the exemplary aspect, the media capture controller is further configured to calculate a distance between each of the plurality of cameras and an object in a live scene using triangulation based on the respective positions of the plurality of cameras relative the live scene.

In another aspect of the exemplary aspect, the media capture controller is further configured to generate a high resolution depth map for each of the plurality of second cameras based on the respective calculated distance to the object in the live scene and to generate the at least one content capture control instruction to perform an autofocus for at least one of the plurality of cameras for the object in the live scene using the high resolution depth map.

In a refinement of the exemplary aspect, the media capture controller is part of a video production environment including a video switcher operable to generate a video production of the live scene at least partially based on the generated metadata feed.

In another exemplary aspect, the system can further include a camera metadata database configured to store the respective camera metadata of the plurality of cameras and link the respective camera metadata of the respective media content captured by at least two of the plurality of cameras, such the that linked media content is configured to be collectively accessed in the database.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1A:
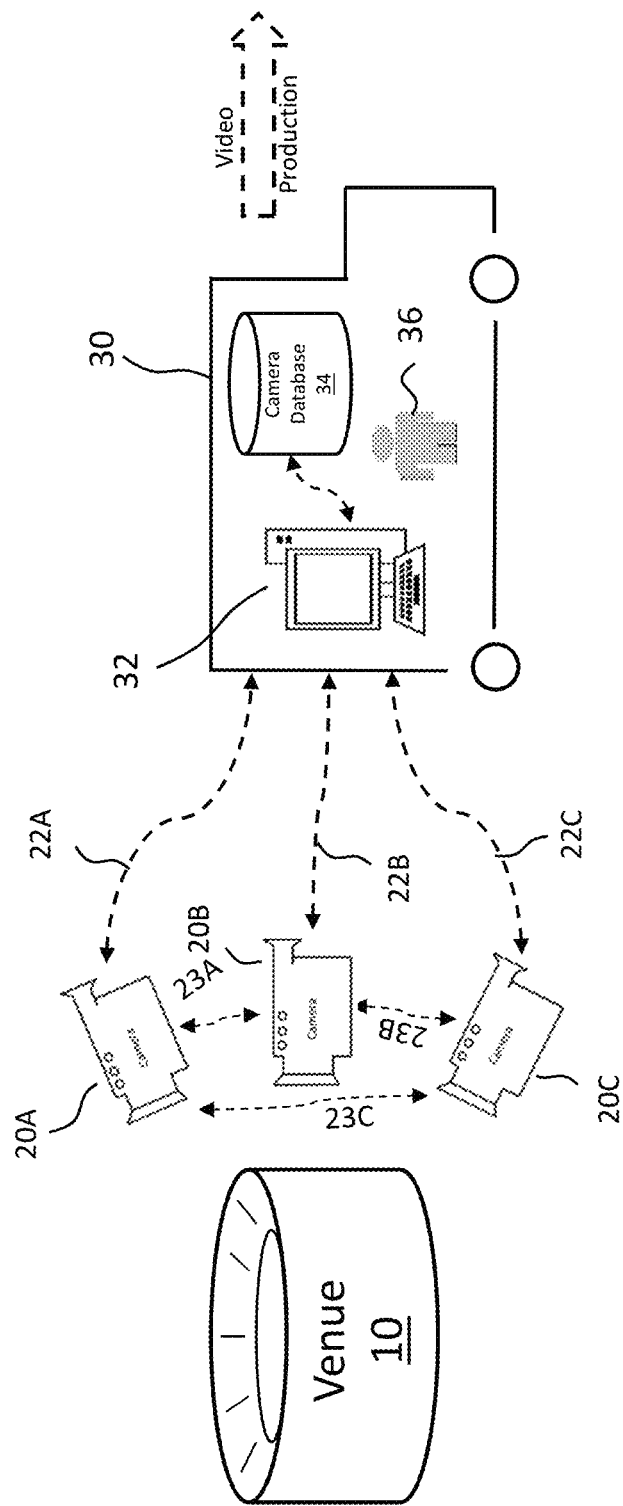
FIG. 1A illustrates a block diagram of a system of using camera metadata from multiple cameras in a live environment to improve video production workflow according to an exemplary embodiment.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Certain aspects of video production systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. For example, one or more of the components of system 100 described below may provide for such processing system. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media may include transitory or non-transitory computer storage media for carrying or having computer-executable instructions or data structures stored thereon. Both transitory and non-transitory storage media may be any available media that can be accessed by a computer as part of the processing system. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Further, when information is transferred or provided over a network or another communications connection (either hardwired, wireless, or combination thereof) to a computer, the computer or processing system properly determines the connection as a transitory or non-transitory computer-readable medium, depending on the particular medium. Thus, any such connection is properly termed a computer-readable medium. Combinations of the above should also be included within the scope of the computer-readable media. Non-transitory computer-readable media excludes signals per se and the air interface.

FIG. 1A illustrates a block diagram of a system using camera metadata from multiple cameras in a live environment to improve video production workflow according to an exemplary embodiment. As shown, the system 100 can include a plurality of cameras 20A, 20B and 20C that are provided to capture media content from a venue 10, such as a sports venue, or other live scene, and provide respective media streams 22A, 22B and 22C that include the captured content and also include metadata relating to the content capture settings of the camera, such as lens and camera settings, position and gyro data/setting (e.g., pan, tilt, roll), for example, to a production environment, such as a production truck 30. For example, camera 20A may capture first media content at a first angle or zoom level from venue 10, camera 20B may capture second media content at a second angle or zoom level from venue 10, and camera 20C may capture third media content at a third angle or zoom level from venue 10, for example. In other words, the three cameras 20A, 20B and 20C can be located at three different positions around the venue 10 for capturing the live content with each camera having unique content capture settings relating to the physical and functional settings of the respective camera.

Moreover, it should be appreciated that audio generated by the camera, for example, can also be used as the metadata. For example, if talents in front of one the cameras 20A, 20B or 20C come close to the specific camera, the metadata may be detected with the sound level and generate a trigger for the other cameras that something interesting may be happening in the 3D space of the venue 10.

As further shown, each camera of the plurality of cameras may be communicatively coupled to each other in system 100. For example, camera 20A may be communicatively coupled to camera 20B by communication path 23A, camera 20C may be communicatively coupled to camera 20B by communication path 23B, and camera 20A may be communicatively coupled to camera 20C by communication path 23C. The communication paths 23A, 23B and 23C may be either hardwired connections, wireless connections, or combination thereof. For example, the wired connections between cameras may be an HDMI or DVI cable or the like and the wireless data communication can be implemented using Bluetooth communication protocols, WiFi communication, other network protocols or the like.

It should also be appreciated that while only three cameras are illustrated in system 100, the system can include any number of cameras to capture media content. For example, major events like the Super Bowl may have 64 cameras or more provided to capture the content at various angles, positions, etc. Moreover, the cameras 22A, 22B and 22C can be operated by a camera operator, and/or mechanically mounted on a pedestal, etc., as would be appreciated to one skilled in the art.

As further shown, the production truck 30 can include video production equipment 32 and a camera database 34. The video production equipment 32 is illustrated as a single computing component for sake of clarity of the discussion regarding FIG. 1A, but it should be appreciated that video production equipment 32 can be composed of production switches, controllers, processors, timing modules, a codec, and other equipment provided to process the incoming media streams for a television broadcast production. Moreover, the camera database 34 is configured to receive and/or store camera information/metadata from one or more of the plurality of cameras 20A, 20B and 20C and (optional)

metadata from other (non-camera) sensors as will be discussed in detail below. Furthermore, a technical director 36 (and other production personnel) can be located at the production facility (i.e., the production truck 30) to control the video production equipment 32, and, more particularly, a video switcher(s) to make editorial and artistic decisions for the video production. It should be appreciated that while the production environment shown in FIG. 1A implements a production truck 32, the video production environment can be provided at a remote video control center according to an alternative aspect.

Figure 1B:
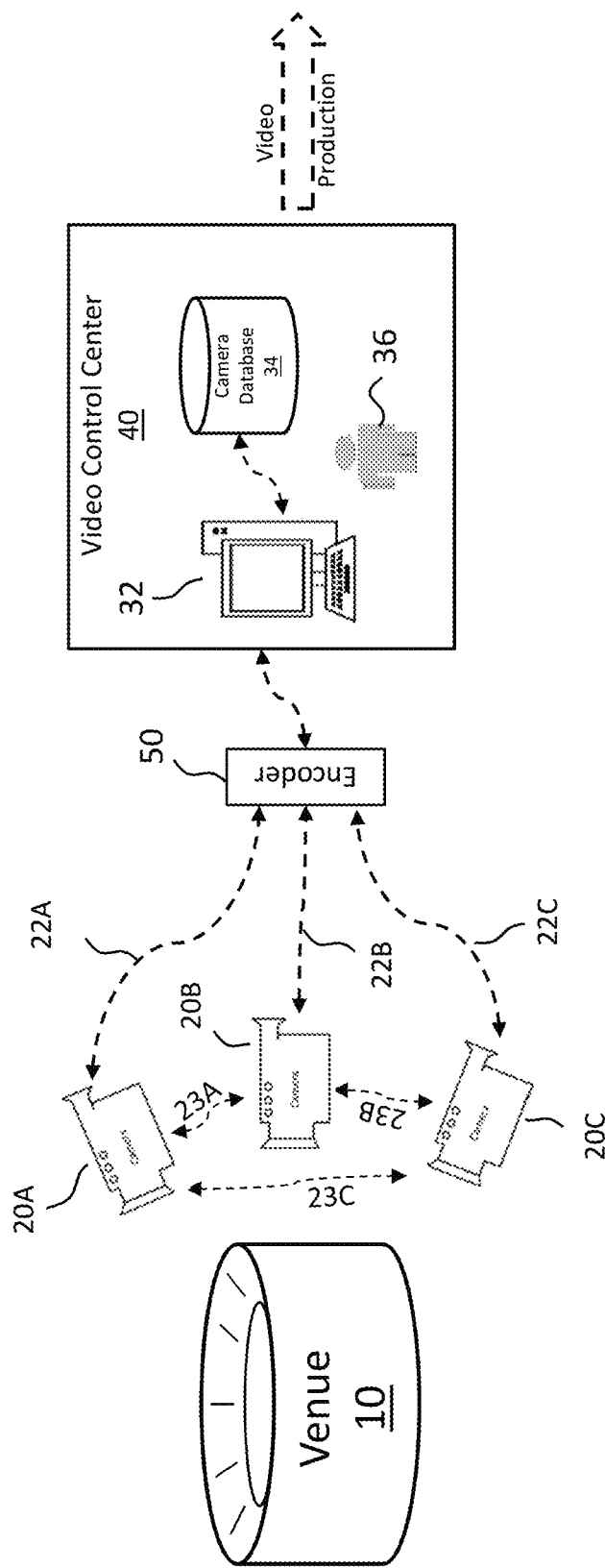
FIG. 1B illustrates a block diagram of a system of using camera metadata from multiple cameras in a live environment to improve video production workflow according to another exemplary embodiment.

For example, FIG. 1B illustrates a block diagram of a system of using camera metadata from multiple cameras in a live environment to improve video production workflow according to another exemplary embodiment. As shown, the system 200 includes many of the same components described above with respect to FIG. 1A. For example, system 200 includes a plurality of cameras 20A-20C configured to capture media content from a live scene, such as venue 10. Moreover, the respective media streams 22A-22C are transmitted (either by wired or wireless transmission) to an encoder 50 (or a plurality of encoders) that, in turn, encodes the media streams and provides the media as contribution feeds to a remote production facility, i.e., the video control center 40, for example.

Typically, the contribution feeds can be transmitted to the remote production facility using satellite communication, for example. Similar to the production truck 30 described above, the remote video control center 40 will typically include video production equipment 32 that can be composed of production switches, controllers, processors, timing modules, a codec, and other equipment provided to process the incoming media streams for a television broadcast production. Moreover, the remote video control center 40 also includes camera database 34 that is provided to receive and/or store camera metadata. A technical director 36 can be located at the remote production facility to control the video switcher(s) and other video production equipment 32 and make editorial and artistic decisions for the video production.

Moreover, although not specifically shown, it should be appreciated that the video production environment can include any combination of the production truck 30 and/or remote video control center 40 where a portion of the video production equipment 32 is located locally at the venue 10 (i.e., in the production truck 30) and a portion of the video production equipment 32 as well as the technical director 36, for example, can be located at the remote control center 40.

In either case, the plurality of cameras 20A, 20B and 20C are configured to store, update and share metadata regarding the camera settings, lens settings and position settings (collectively considered the content capture settings) according to the exemplary embodiment. More particularly, each camera 20A, 20B and 20C includes a computer processing unit (CPU), memory and other common hardware and software components configured to store and/or update information relating to the camera settings, control operations, physical parameters, and the like. Generally, the information stored in each camera and communicated to other cameras and/or a central control system is referred to as "camera metadata" for purposes of this disclosure. The camera metadata can include, for example, camera lens information (e.g., focal length, maximum aperture, and the like), depth maps, depth map derived masks, position data, pan/tilt/roll data, and other camera settings. As will be described in detail below, each camera stores in memory its camera metadata and is further configured to continuously (or periodically) update the camera metadata based on changes in the setting, parameters, etc., in response to changes made by the camera operator, changes in positioning of the camera, and the like. Moreover, in a refinement of this exemplary aspect, each camera can be configured to store metadata related to the captured content. For example, if the camera identifies a person at the venue 10 (e.g., using facial recognition technology or by receiving an input with this information from the camera operator) the camera can store this information as metadata as well.

According to the exemplary embodiment, each camera of the plurality of cameras 20A, 20B and 20C is configured to share its respective metadata with the other cameras using, for example, the communication connections 23A, 23B and/or 23C. Alternatively, or in addition, the plurality of cameras 20A, 20B and 20C can also be configured to transmit its respective metadata to a central controller (e.g., a content capture controller) or computing unit, which can be a component of the video production equipment 32, for example. As will be described in detail below, the metadata for the plurality of cameras 20A, 20B and 20C can be utilized to optimized video/television production workflow according to the exemplary embodiment.

In one exemplary aspect, each of the plurality of cameras 20A, 20B and 20C can include a global positioning system ("GPS") sensor and other position and movement sensors (e.g., gyrometers) that are configured to determine the positioning of the specific camera (e.g., within and/or at the venue 10) and transmit its positioning including field of view data, for example, to other cameras and/or the video production equipment 32. Moreover, in one aspect, this information can then be stored in camera database 34, which may maintain a current database of the positioning of each camera currently capturing media content in venue 10. According to the exemplary embodiment, based on additional data, such as the pan, tilt and roll data for each camera, the other cameras and/or central system will be able to determine the relative content capturing angle of each camera in the system 100 (or 200).

According to the exemplary aspect, any of the cameras or the central controller can be configured as metadata feed generator that can generate a 3D metadata feed, which is effectively a data stream indicating the camera settings, position, and the like, of all cameras currently captured media content of the live scene. As discussed in detail below, this information can be used in a variety of ways to coordinate and facilitate live video production workflow.

It should be appreciated that while the exemplary embodiments describe the sharing of metadata among a plurality of cameras 20A, 20B and 20C, in other embodiments, one or a plurality of alternative electronic devices can share its metadata (including operational status) with one or a plurality of cameras 20A, 20B and 20C to facilitate the video production workflow. For example, LED lighting is currently being combined with Internet of Things, i.e., the internetworking of physical devices. In this regard, there are many systems in which LED lighting can be controlled via Ethernet and LED lighting itself can send out data via the principle of Variable Light Coding. According to an exemplary embodiment, it is contemplated that data transmitted by such LED light (or other types of electronic devices) can be used in combination with the plurality of cameras 20A, 20B and 20C (e.g., as broadcast cameras) during video production. For example, it is contemplated that the LED lighting is synchronized to the video clocks inside the camera and Variable Light Coding data in video lines is transmitted that lays outside the picture frame that is broadcasted. In this case, each camera can detect codes from the lighting used in its environment and thus determine its position and even the direction it is directed, for example, using the principles described herein. In addition, the lighting may also be configured to transmit the color temperature used, enabling the receiving camera to automatically adapt to the color, for example.

Thus, in an exemplary aspect, one or more lighting devices (e.g., LED lighting devices) can be located at the venue 10 and configured to generate lighting metadata relating to the operational settings of the lighting device. These operational settings can be, for example, lighting position/direction, brightness level, and the like. In turn, the lighting device can transmit the generated lighting metadata to the metadata feed generator (e.g., the controller described above) that can use the lighting metadata to generate the metadata feed (e.g., combining it with the other camera metadata). This metadata feed can then be used to generate one or more control instructions that can be transmitted back to the one or more cameras at the venue 10 to adjust the operations of the cameras, which are effectively based on the operational settings of the lighting device(s).

Figure 2:
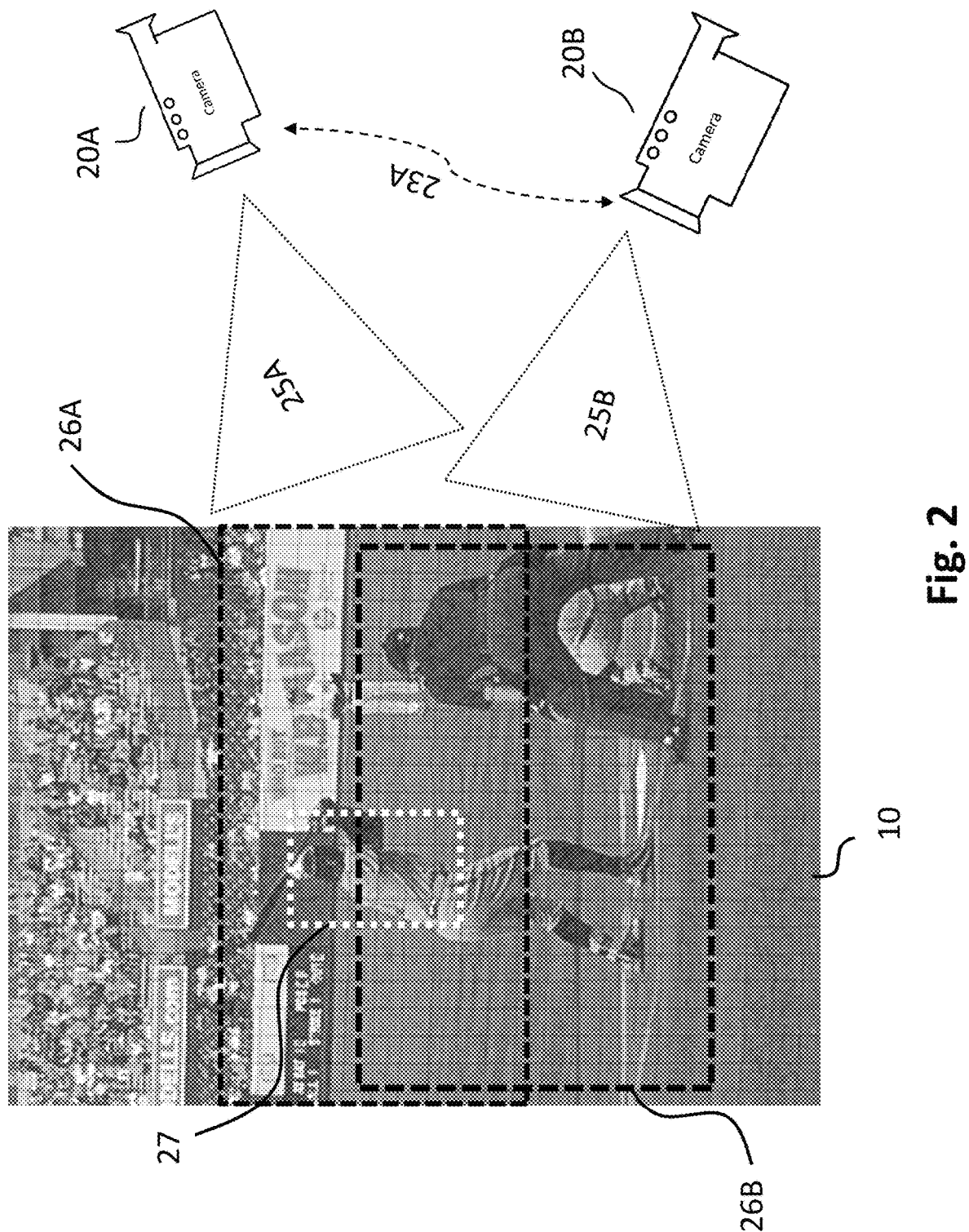
FIG. 2 illustrates an exemplary diagram of an implementation of the system of using camera metadata from multiple cameras in a live environment to improve video production workflow according to the exemplary embodiment.

FIG. 2 illustrates an exemplary diagram of an implementation of the system of using camera metadata from multiple cameras in a live environment to improve video production workflow according to the exemplary embodiment. In this example, venue 10 can be a professional baseball game and camera 20A can be initially positioned behind first base with a viewing angle facing towards the hitter from the perspective of the first baseman. Moreover, camera 20B may be positioned behind home plate with a viewing angle facing towards the batter and towards the pitcher. In this example, camera 20A is shown to have a field of view 25A and capture media content 26A (i.e., a captured "frame"), which is indicated by a dashed rectangle. Similarly, camera 20B is shown to have a field of view 25B and capture media content 26B (i.e., a captured "frame"), which is also indicated by a dashed rectangle.

According to the exemplary embodiment, cameras 20A and 20B can share the camera metadata including, for example, position data and pan/tilt/roll data, with each other by communication path 23A, which can be a hardwired or wireless connection as described above. Moreover, this camera metadata can also be transmitted to a central control system (i.e., a "media capture controller"), such as a controller of video production equipment 32, as part of a 3D metadata feed. By knowing the position data of each of camera as well as the field of views, the other cameras and/or central media capture controller can determine whether the other camera (and any additional cameras not shown in FIG. 2) have overlapping views and provide alternate views.

Moreover, according to the exemplary embodiments, each of the plurality of cameras (e.g., cameras 20A and 20B) includes components to perform autofocus functions of one or more objects (also referred to as "elements") in a captured frame. As shown, during video production, each production camera 20A and 20B will have a field of view 25A and 25B, respectively, directed towards the live scene 10. Inevitably, within the live scene there will be specific important objects for the storytelling process, such as a baseball hitter's face and/or number (e.g., object 27) in the live scene 10, for example. Existing camera technologies include autofocus components and techniques that enable the production camera to identify such objects and adjust the zoom levels, etc., to focus in on these objects. For example, the camera will analyze the pixel array to determine a high frequency, high delta between two adjacent pixels in the array, which will indicate that the specific object must be "in focus". There are many existing camera technologies that provide autofocus features and will not be described in detail herein. However, according to the exemplary aspect, each camera 20A and 20B is configured to generate data corresponding to the identification of in focus objects that effectively identifies (by a framing of the object, for example) that the object is actually in focus.

Furthermore, according to an exemplary aspect, the cameras and/or central media capture controller is configured to determine identical objects in overlapping views and calculate the distance from each camera providing one of the overlapping views to the same object (e.g., object 27 shown in FIG. 2). In general, images of a live scene (e.g., venue 10) captured by a plurality of cameras have differences due to the different points of view resulting from the different locations of the cameras. This effect is known as parallax whereby the position or direction of an object (e.g., object 27) appears to differ when viewed from different positions of the different cameras. These differences provide information that can be used to measure depth of the object within the live scene. Moreover, the field of view 25A and 25B of the plurality of cameras (e.g., cameras 20A and 20B), respectively, includes the foreground object 27 and at least some overlapping background objects (e.g., the pitcher, fans, advertisements, etc.). The disparity introduced by the different fields of view 25A and 25B of the two cameras 20A and 20B will be equal to the difference in location of the foreground object 25 between its location in the image content captured by the first camera 20A and the location of the foreground object 25 in the image content captured by the second camera 20B and/or additional cameras (not shown). The distance from each camera to the foreground object 25 can be obtained by calculating the disparity of the foreground object in the two captured images by the two cameras 20A and 20B.

Thus, according to the exemplary aspect, any of the cameras and/or the control system can use the triangulation methods based on the position of each cameras and the calculated distance to the object (e.g., the identified hitter 27) to create a high resolution depth map for the captured image(s) and identified object therein. In other words, the cameras can transmit the calculated distance to the objection as well as its determined position (e.g., based on GPS data) to the control system. In turn, the control system can calculate the depth map to be used by one or more cameras. For example, in one aspect, the depth map can be used for a variety of video production functionalities. For example, the depth map can be used to facilitate the autofocus (e.g., by camera 20A and/or 20B) of the specified identified object in the capture scene for each camera. More particularly, the media capture controller can, based on the metadata feed, generate one or more content capture control instructions that can be transmitted to one or more of the cameras and configured to modify the content capture settings of the specific cameras to control the respective capturing of the media content (e.g., by adjusting/modifying the settings).

Moreover, the depth map can identify features/distances and the like for the background objects, for example, the advertisements shown in FIG. 2. During video production, this information can then be used to facilitate the processing of the objects, for example, focus the image processing of the respective camera on the identified foreground objects compared with the background objects.

It should also be appreciated that a total depth map is not required for the exemplary embodiment. Instead, the triangulation method is sufficient to determine the distance between the object (e.g., the identified hitter 27) and the one or more cameras (e.g., camera 20A and/or 20B). With the lens settings zoom, iris opening and distance, the system is configured to set the depth of field for the camera to ensure that the identified object is within the depth of field and, therefore, in focus. In this aspect, depth maps can further enhance focusing. For example, based on the depth map, each camera can determine that the depth of field is too shallow to keep the object continuously in focus in case of fast movements by the object. In another example, the depth map can be used to identify that a number of objects close to the identified object are outside the depth of field. In certain applications, the camera can decide to adapt either the depth of field or to shift "the middle of the depth of field" to another distance to also get these objects in focus.

Furthermore, according to an exemplary aspect, depth maps can be used to adapt sharpening algorithms where backgrounds get less sharpening (or even negative sharpening) and in focus objects get more sharpening to enhance the picture. Advantageously, where data compression is being used to reduce the amount of data that has to be transmitted, the depth map (foreground-background) can be used to reduce the amount of data transmitted for the background, while not sacrificing picture quality.

Thus, in general, by linking depth maps of different cameras and combining them also with metadata from cameras (e.g., triangulation data, lens data), the disclosed system and method can further be used to enhance individual depth maps for each camera, which advantageously can be useful for all applications that require depth maps, such as virtual reality applications, for example.

Moreover, in a refinement of the exemplary embodiment, the camera metadata provided by each camera capturing the live scene can be used to automatically match the blacks and colors in the overlapping views based on the black and color information in the overlapping portions of the captured image content. This information can be used to provide a scene on a single display screen, for example, to the technical director 36 that may include some type of visual indicator (e.g., an electronic visual indicator as dashed lines, highlighted sections, etc.) that shows each capture image from each camera with the visual indicators illustrate where the images overlap, similar to the dashed rectangle boxes depicted in FIG. 2.

In another aspect, camera metadata can be used to group cameras that have similar positions (i.e. physical locations) with respect to the sun and lighting used. In other words, by measuring and tracking this data in controlled or semi-controlled environments, such as a stadium, the metadata can be used to determine matching relations between groups of cameras saving on human intervention in shading cameras. Thus, a group of cameras positioned on one side of the scene may have equal black setting and color gains (due to shadow effects, for example) or show the same behavior over time, but with an offset.

In yet another exemplary aspect, each camera of the plurality of cameras 20A, 20B and 20C and/or a central controller (e.g., a controller of the video production equipment 32) can receive lens information from a plurality of cameras and use this information to match the iris, gains and depth of field for each camera that is creating overlapping views of the scene. By matching these camera parameters, the system can effectively create and manipulate alternative viewpoints of the same scene. For example, if the system is designed to automatically create alternative views of a certain scene from different cameras, the system may create and control the alternative scenes and views such that they each use the same or at least a similar depth of field. In the exemplary embodiment, from the settings of the main camera (which can be any of the selected cameras), the object distance, front and back of depth of field can be calculated as described above. Then, this information can be combined with object distance for one or more other cameras to set the focus point and iris opening to create a similar depth of field for those other cameras camera with the identified object in focus for each such camera. Moreover, in this aspect, the individual black and gain settings in the other camera(s) can be used to match the video of the main camera.

In one aspect, the video production equipment 32 can also include a multi-view interface that is configured to display each of the alternative viewpoints generated by one or more of the plurality of cameras, respectively. In addition, a video switcher controller coupled to the multi-view interface can be configured to receive at least one control instruction from the technical director 36 of the live video broadcast production, where the at least one control instruction is provided to select a desired viewpoint for video production.

Furthermore, in one exemplary aspect, when a central controller of the video production equipment 32 receives camera metadata from each of the plurality of cameras 20A, 20B and 20C of the system 100 (or system 200), the central controller is configured to determine all overlapping scenes, but also determine whether there are any portions of the live scene (e.g., venue 10) that are not currently being covered, i.e., certain live content is of interest, but not being captured by any of the cameras in the scene. For example, referring to the live scene 10 shown in FIG. 2, for example, two overlapping scenes 26A and 26B are currently being captured. However, the central controller may include instructions to ensure that the background advertisement for "Modell's" should be captured by at least one of the images. However, based on the image content and camera metadata, the central controller can determine that advertisement portion of the live scene is currently not covered.

Figure 3:
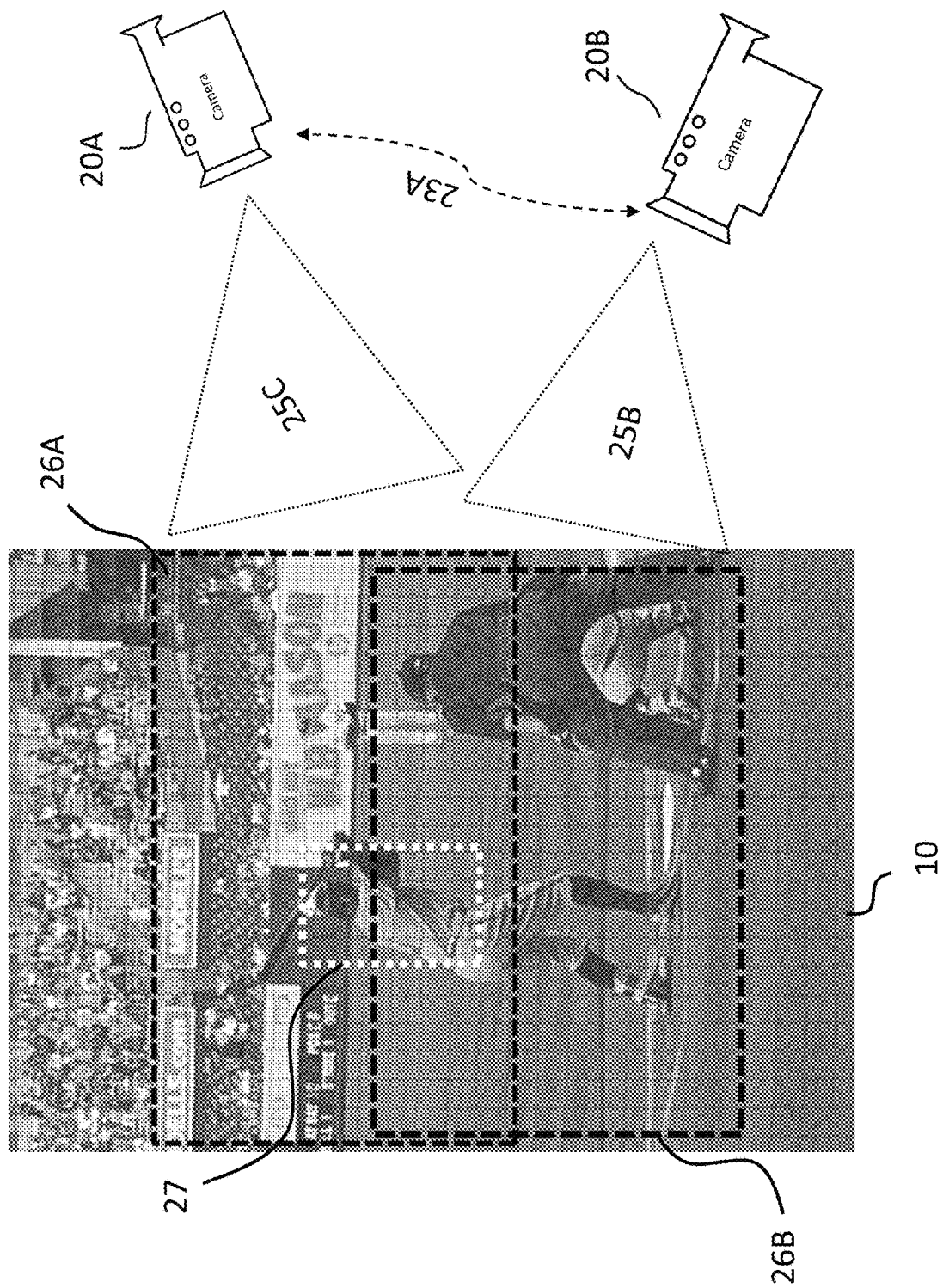
FIG. 3 illustrates an exemplary diagram of an implementation of the system of using camera metadata from multiple cameras in a live environment to improve video production workflow according to a refinement of the exemplary embodiment.

In this example, camera positioning instructions (e.g., an example of a content capture control instruction) can be sent to one of cameras 20A or 20B (or an additional camera) to change/modify the field of view (e.g., field of view 25A switches to field of view 25C) by adjusting the media content capture settings to ensure this missing portion of the scene is covered (i.e., field of view 25C includes the advertisement for "Modell's"). For example, camera 20A may be an unmanned camera on a motorized pedestal and the content capture control instructions can adjust the content capture settings of the camera 20A to move its position (or zoom level or panning, tilt, etc., to adjust field of view to 25C) to change and/or increase the overall coverage of the scene. FIG. 3 illustrates a resulting modification of the scene in which the field of view 25A and corresponding captured image 26A have moved upwards, while the coverage by camera 20B has stayed constant. As a result, the overall coverage of live scene 10 has increased. In a refinement of this aspect, the new viewpoints can be created with interpolation and warping algorithms for virtual reality applications, for example.

Moreover, in one exemplary aspect, control instructions can also be generated and transmitted to one or more cameras of the plurality of cameras to create an audio zoom. For example, the technical director 36 may want to capture audio of the identified object (e.g., the identified hitter 27). In this regard, the central controller of the video production equipment 32 can use lens information of each camera (e.g., zoom settings, focal point, etc.) to identify one of the plurality of cameras that may be most effective to capture the audio data from the identified object. Control instructions can be transmitted to the identified camera to create an audio zoom for the audio data generated by the identified object. Moreover, it should be appreciated that the audio zoom can be captured by a first camera (e.g., camera 20A) which may be better positioned to capture the audio data, while the video content captured by a second camera (e.g., camera 20B) can be used for the video data for the resulting video broadcast production.

In yet another exemplary aspect, the camera metadata can be used to facilitate automatic video production control. For example, referring again to FIG. 2, after identifying the overlapping viewpoints of the live scene 10, each camera can also use object recognition techniques and other matching techniques to identify one or more specific objects (e.g., baseball hitter 27) in the overlapped scene. In general, the object recognition algorithms can use existing matching, learning, or pattern recognition algorithms using appearance-based or feature-based techniques of the object. Moreover, the video content captured by each camera of the plurality of cameras 20A-20C can be stored in camera database 34 (or a separate video content database), for example. By identifying matching objects in two or more of the captured media streams, the content stored in camera database 34 can be linked using the metadata. In other words, each captured media stream that includes the identified object (e.g., baseball hitter 27) can be linked in the database to all other media streams that also include this identified object and archived accordingly. Then, during production of a video for processing and subsequent distribution, a technical director or other editor can quickly access all videos that have the specific desired object and select the desired media stream from among the plurality of linked media streams.

In yet a refinement of this aspect, all linked media streams can be displayed on the multi-viewer interface for the technical director 36 to view during a live production, for example. Moreover, if there are ten cameras, but only three screens of the multi-viewer interface, for example, the three screens can be controlled to display the video content from respective cameras that include the identified object (e.g., baseball hitter 27) and that are linked to one another based on the transmitted metadata. This will enable the technical director to avoid being presented with live scenes captured by other cameras that are not of particular interest for the current broadcast. Moreover, one or more of the alternate viewpoints of one of the cameras can be recorded and played out as a second iso-channel. For example, a primary media stream that includes the targeted object can be selected by the technical director 36 for video broadcast, while one or more secondary media streams that are linked and also include the targeted object, but from a different viewing angle or perspective, can be played out on a secondary channel, such as a second stream over the Internet where it can be displayed to an end consumer on a smartphone, computing device, tablet, or the like. As a result, the video production environment provides a sophisticated, yet automated and easily operable, multi-device experience for the end consumer.

In a further embodiment, it is contemplated that alternative systems like RFID (radio-frequency identification) systems and the like and can be implemented in the exemplary systems 100 (or 200), for example. Moreover, RFID chips/tags can be provided for one or more objects/persons in a live scene. For example, in a competitive races such as a bicycling or high performance sports car race, RFID chips can be provided for each bicyclist, racecar, etc., during the race. The RFID chips can include information about the object is associated with and which can be transmitted to each camera or an associated RFID receiving device, for example. Then, during content processing, the specific objects captured in each media stream by each camera as discussed above can be connected to the corresponding information identified by the RFID sensors. This information can then be used for tagging each object in each scene using the image recognition techniques described above. Moreover, the tagging can then be used for archiving the captured media streams in camera database 34, for example. This enables a video editor to subsequently find relevant scenes in the archives quickly by using the tagged information. By doing so, a technical director or video editor can quickly create and transmit to end consumers different types of second screen applications, such as tablets, that enable the end consumers to select the different objects on the media content and be presented with background information of the specific object, that may be provided by the RFID tags, for example.

Figure 4:
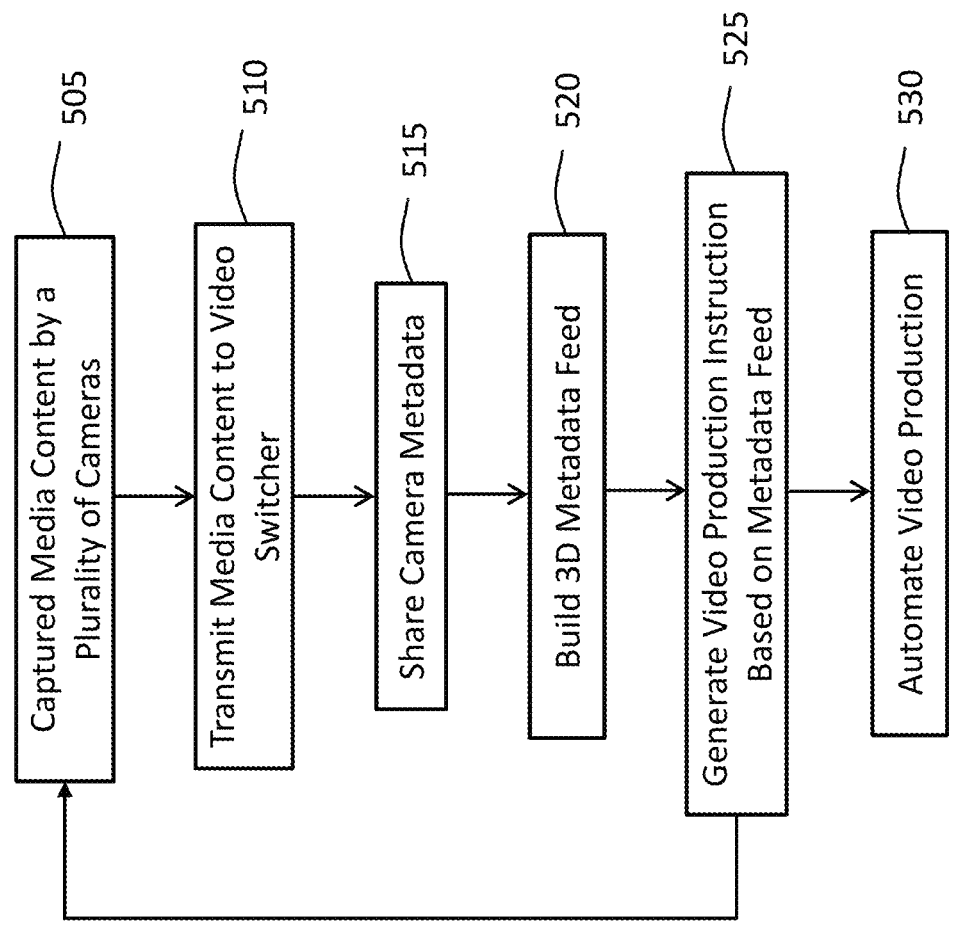
FIG. 4 illustrates a flowchart for a method of using camera metadata from multiple cameras in a live environment to improve video production workflow according to an exemplary embodiment.

FIG. 4 illustrates a flowchart for a method of using camera metadata from multiple cameras in a live environment to improve video production workflow according to an exemplary embodiment. It should be appreciated that the following description of the exemplary method 500 refers to the same components of the exemplary systems described above. As shown, initially at step 505, a plurality of cameras (e.g., cameras 20A-20C) located at a live scene are configured to capture live content, such as content from venue 10 as described above. That is, each of the first camera 20A, the second camera 20B and the third camera 20C are configured to capture the respective first, second and third media content of a live scene (e.g., from different positions) and are configured to generate and/or store respective camera metadata relating to content capture settings including, for example, camera lens, position and gyro settings of the respective camera.

Next, at step 510, the captured audio and video media content, which can be high resolution signals, for example, can be encoded as contribution feeds using existing video compression techniques, such as, for example, high efficiency video coding ("HEVC"), MPEG-4, or the like using high level high profile settings, such as 4:2:2 10 bit encoding. The encoded media content from each camera is then transmitted to video production equipment 32, including, for example, a video switcher and multi-viewer interface where the content can be presented to a technical director during video production.

In addition, at step 515, one or more of the plurality of cameras can share the generated and stored camera metadata with other cameras in the system and/or the video production equipment, which may include a central controller. As described above, the camera metadata can include camera setting information, positioning information, and the like. In one aspect, this information can be stored in a camera database 34. By combining the camera metadata of two or more cameras, a 3D metadata feed can be built/generated at step 520, either by one or more of the cameras or alternatively by a capture content controller. In other words, because the plurality of cameras have varied positions, angle, etc., with respect to the live scene of which media content is being captured, the combination of 2D video images captured by each camera (by itself) effectively can be combined to be considered a 3D representation of the live scene with a corresponding 3D metadata feed.

Thus, in an exemplary aspect, one (or more) of the plurality of cameras 20A-20C can receive the camera metadata from the other of the cameras 20A-20C and can generate the 3D metadata feed as a combination of the camera metadata from the plurality of cameras. The 3D metadata feed is a combination of the camera metadata from each camera and will include positioning data of the cameras, and the like, for example. It should be appreciated that the metadata from each camera in the 3D metadata model shall stay linked to individual video and audio streams for that camera for archival purposes (i.e., to enable searching of the archive based on data in the 3D metadata model).

The 3D metadata can be used to generate video production instructions (e.g., media content control instructions) by the central controller and/or another camera. For example, as described above, the content capture controller can be configured to generate a depth map of the captured 3D scene and also determine if there are portions of the scene that are not captured by any of the cameras. In this instance, a control instruction can be generated by the central controller and transmitted to one or more of the cameras to adjust its positioning, zoom level, etc., in order to improve the capture area of the live scene. Other control instructions may include autofocus on a common object in overlapping viewpoints of two or more of the plurality of cameras, for example, tracking of the object by motorized pedestals so that as the object leaves the field of view of one camera, another camera is positioned to automatically begin tracking the object, and the like. Further automated functions include adjusting the depth of field, blacks, colors, and the like, as described above.

As further described above, the metadata feed can be used for post-production editing and video creation. For example, the metadata set may contain information on players in a game (e.g., by tracking player numbers or names, for example) as well as tracking various of statistics, such as distances run in a game, percentage of time on one side of the field, time of possession for each team, and the like. This data can be archived in a database and subsequently analyzed (e.g., off-line) to determine patterns in a game. Moreover, settings used per camera, per position, over time (per time of the year), for example, can be used to further automate certain productions.

Moreover, the database can be used to provide certain camera positions alerts. For example, in a car or bicycle race, for example, the camera operator standing behind a corner can receive signals from another camera or the metadata model that the next car is approaching and adjust the camera accordingly to track this car. In a further example, for an inside venue, the camera operator standing in front of the stage, looking toward the stage, might be warned that a person is walking towards the stage on the right side of the camera (where the camera operator has a blind spot) and may enter the field of view of the camera unexpectedly. This notification enables the camera to quickly adjust the camera angle to track the person walking on the stage. Moreover, as described above, the database can be used to direct a number of unmanned cameras on robotics to cover parts of the scene that are not otherwise covered by the panning manned cameras.

In any event, as finally shown at step 530, the 3D metadata feed may be used by the video production equipment to automate one or more steps of the remote processing for the video production. For example, the captured media content from a plurality of cameras can be linked based on the metadata (e.g., common object recognized in at least a portion of the captured images). These linked media streams can then be displayed on a multi-viewer interface, for example, enabling the technical director 36 to quickly and easily select the desired viewpoint (or plurality of viewpoints for multiple application) of the target object.

Accordingly, it should be appreciated that the exemplary system and method facilitates automation of video production of a live scene by sharing camera metadata and creating a 3D metadata feed that can be used to control the pre-production and production phases of a live video production. It should be understood that conventional post production and publication phases can be implemented using conventional techniques. In particular, the post-production phase of live show production typically involves the manipulation of content to perform certain tasks, such as editing, for example, such as content manipulation including the insertion of an advertisement, or even new content into a time slot between successive content segments. Moreover, the publication phase of live show production typically entails the distribution of content to viewers, which entails terrestrial transmission over the air or transmission to one or more satellite or cable systems or over one or more networks, such as the Internet. The details of these phases should be appreciated to those skilled in the art and have not been included herein so as to not unnecessarily obscure the aspects of the disclosed methods and systems.

By way of example and without limitation, the aspects of the present disclosure are presented with reference to systems and methods used to configure various components of a video production system that may be used for production of television programming or at sports events. The various concepts presented throughout this disclosure may be implemented across a broad variety of imaging applications, including systems that capture and process video and/or still images, video conferencing systems, surveillance security systems, and so on. It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. All structural and functional equivalents to the elements of the various aspects described throughout this disclosure that are known or later come to be known to those of ordinary skill in the art are expressly incorporated herein by reference and are intended to be encompassed by the claims.

What is claimed:

1. A system of using camera metadata from multiple cameras in a live environment for video content capture and production, the system comprising:
   a first camera configured to capture first media content of a live scene and configured to store first camera metadata relating to image capture settings of the first camera including camera lens and gyro settings of the first camera and a respective position of the first camera relative to the live scene;

a second camera configured to capture second media content of the live scene and configured to store second camera metadata relating to image capture settings of the second camera including camera lens and gyro settings of the second camera and a respective position of the second camera relative to the live scene;

at least one metadata feed generator configured to generate a three-dimensional (3D) metadata feed using at least the first and second camera metadata, with the 3D metadata feed indicating the image capture settings and relative position of the first and second cameras with respect to one another and relative to the live scene, such that the 3D metadata feed identifies current respective viewpoints of the first and second cameras of the live scene; and a content capture controller configured to generate at least one control instruction based on the generated 3D metadata feed, with the at least one control instruction based on the current respective viewpoints of the first and second cameras of the live scene;

wherein the at least one control instruction is transmitted to the first camera to control a camera operation thereof by adjusting the image capture settings to coordinate capturing the first media content with the image capture settings and relative position of the second camera for capturing the second media content, wherein the first and second camera metadata includes respective positions of the first and second cameras relative to the live scene, wherein the at least one metadata feed generator is further configured to calculate a distance between at least one of the first and second cameras and an object in the live scene using triangulation based on the respective positions of the first and second cameras, wherein the content capture controller is further configured to generate a depth map for the at least one camera based on the distance from the at least one camera to the object in the live scene and to generate the at least one control instruction to autofocus the at least one camera for the object in the live scene using the generated depth map.

2. The system of claim 1, wherein the content capture controller is part of a video production environment including a video switcher operable to generate a video production of the live scene at least partially based on the 3D metadata feed.

3. The system of claim 1, further comprising a database configured to store the first camera metadata and the second camera metadata and link the respective camera metadata to the captured first and second media content.

4. The system of claim 3, further comprising a multi-viewer interface configured to select the captured first and second media content based on the linked metadata and to display the captured first and second media content.

5. The system of claim 1, wherein the at least one control instruction controls at least one of the camera lens, gyro setting of the first camera to modify the capturing of the first media content.

6. The system of claim 1, further comprising at least one lighting device configured to generate lighting metadata relating to at least one operational setting of the at least one lighting device, and wherein the at least one metadata feed generator is further configured to generate the 3D metadata feed using the lighting metadata, such that the at least one control instruction is configured to adjust an operation of the first camera based on the at least one operational setting of the at least one lighting device.

7. A system of using camera metadata from multiple cameras in a live environment for video content capture and production, the system comprising:

a first camera configured to capture first media content of a live scene and configured to store first camera metadata relating to content capture settings of the first camera;

a second camera configured to capture second media content of the live scene and configured to store second camera metadata relating to content capture settings of the second camera; and a controller configured to:
generate a three-dimensional (3D) metadata feed using at least the first and second camera metadata, with the 3D metadata feed indicating the content capture settings and relative position of the first and second cameras with respect to one another and relative to the live scene, such that the 3D metadata feed identifies current respective viewpoints of the first and second cameras of the live scene, generate a content capture control instruction based at least partially on the generated 3D metadata feed, with the content capture control instruction based on the current respective viewpoints of the first and second cameras of the live scene, and transmit the generated content capture control instruction to the first camera to control camera operation thereof by adjusting the image capture settings to coordinate capturing the first media content with capturing the second media content based on the content capture settings and the relative position of the second camera.

8. The system of claim 7, wherein the content capture settings of the first and second cameras comprise camera lens, position and gyro settings of the respective camera.

9. The system of claim 7, wherein the controller is part of a video production environment including a video switcher operable to generate a video production of the live scene at least partially based on the 3D metadata feed.

10. The system of claim 7, further comprising a database configured to store the first camera metadata and the second camera metadata and link the respective camera metadata to the captured first and second media content, such the that captured first and second media content are configured to be collectively accessed in the database based on the respective linked camera metadata.

11. The system of claim 7, wherein the controller is further configured to calculate a distance between each of the first and second cameras and an object in the live scene using triangulation based on the respective positions of the first and second cameras relative to the live scene.

12. The system of claim 11, wherein the controller is further configured to generate a depth map for each of the first and second cameras based on the respective calculated distance to the object in the live scene and to generate the content capture control instruction to perform an autofocus for at least one of the first and second cameras for the object in the live scene using the depth map.

13. The system of claim 7, wherein the content capture control instruction is configured to control the content capture settings of the first camera to modify the capturing of the first media content.

14. The system of claim 7, further comprising at least one lighting device configured to generate lighting metadata relating to at least one operational setting of the at least one lighting device, and wherein the controller is further configured to generate the 3D metadata feed using the lighting metadata, such that the content capture control instruction is configured to adjust an operation of the first camera to control the camera operation for capturing the first media content based on the at least one operational setting of the at least one lighting device.

15. A system for dynamically controlling video content capture using camera metadata, the system comprising:
   a plurality of cameras each configured to capture media content and to generate respective camera metadata relating to at least one content capture setting of the respective camera for capturing the respective media content;
   a metadata feed generator configured to generate a three-dimensional (3D) metadata feed by combining the generated camera metadata from the plurality of cameras, with the 3D metadata feed indicating settings and relative position of the plurality of cameras with respect to one another and relative to the captured media content, such that the 3D metadata feed identifies current respective viewpoints of the plurality of cameras of the captured media content; and
   a media capture controller configured to generate at least one content capture control instruction based on the 3D generated metadata feed, with the at least one content capture control instruction based on the current respective viewpoints of the plurality of cameras of the captured media content;
   wherein the at least one content capture control instruction is configured to modify the at least one content capture setting of at least one of the plurality of cameras to coordinate the respective capturing of the media content by the at least one camera with content capture settings and relative position of another camera of the plurality of cameras for capturing respective media content.

16. The system of claim 15, wherein the respective content capture settings of the plurality of cameras comprise camera lens, position and gyro settings of the respective camera and the generated at least one content capture control instruction modifies at least one setting of the camera lens, position and gyro settings of the respective camera.

17. The system of claim 15, wherein the media capture controller is further configured to calculate a distance between each of the plurality of cameras and an object in a live scene using triangulation based on the respective positions of the plurality of cameras relative the live scene.

18. The system of claim 17, wherein the media capture controller is further configured to generate a depth map for each of the plurality of cameras based on the respective calculated distance to the object in the live scene and to generate the at least one content capture control instruction to perform an autofocus for at least one of the plurality of cameras for the object in the live scene using the depth map.

19. The system of claim 15, wherein the media capture controller is part of a video production environment including a video switcher operable to generate a video production of the live scene at least partially based on the generated 3D metadata feed.

20. The system of claim 15, further comprising a camera metadata database configured to store the respective camera metadata of the plurality of cameras and link the respective camera metadata to the respective media content captured by at least two of the plurality of cameras, such the that linked media content is configured to be collectively accessed in the database.

21. The system of claim 15, further comprising at least one lighting device configured to generate lighting metadata relating to at least one operational setting of the at least one lighting device, and wherein the metadata feed generator is further configured to generate the 3D metadata feed by combining the lighting metadata, such that the at least one content capture control instruction is configured to adjust the at least one content capture setting of the at least one of the plurality of cameras to control the respective capturing of the media content based on the at least one operational setting of the at least one lighting device.

* * * * *